United States Patent
Grenie et al.

(10) Patent No.: US 9,958,564 B2
(45) Date of Patent: May 1, 2018

(54) MULTI-VESSEL SEISMIC ACQUISITION SYSTEM AND METHOD

(71) Applicant: CGG SERVICES SA, Massy (FR)

(72) Inventors: Damien Grenie, Limours (FR); Thomas Mensch, Paris (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days. days.

(21) Appl. No.: 14/902,926

(22) PCT Filed: Jul. 24, 2014

(86) PCT No.: PCT/EP2014/065977
§ 371 (c)(1),
(2) Date: Jan. 22, 2016

(87) PCT Pub. No.: WO2015/011247
PCT Pub. Date: Jan. 29, 2015

(65) Prior Publication Data
US 2016/0170061 A1 Jun. 16, 2016

Related U.S. Application Data

(60) Provisional application No. 61/977,285, filed on Apr. 9, 2014, provisional application No. 61/927,200, filed on Jan. 14, 2014, provisional application No. 61/858,841, filed on Jul. 26, 2013.

(51) Int. Cl.
*G01V 1/38* (2006.01)
(52) U.S. Cl.
CPC .................. *G01V 1/3808* (2013.01)

(58) Field of Classification Search
CPC .................................................... G01V 1/3808
USPC ............................................................ 367/15
See application file for complete search history.

(56) References Cited

U.S. PATENT DOCUMENTS

| | | | | |
|---|---|---|---|---|
| 6,906,981 B2* | 6/2005 | Vaage | .................. | G01V 1/3808 181/110 |
| 7,869,955 B2* | 1/2011 | Zhang | .................... | G01V 1/282 367/14 |
| 8,780,669 B2* | 7/2014 | Janiszewski | ......... | G01V 1/3826 367/15 |
| 8,848,483 B2 | 9/2014 | Mandroux et al. | | |
| 9,103,943 B2* | 8/2015 | Cowlard | ............. | G01V 1/3808 |
| 2012/0002503 A1 | 1/2012 | Janiszewski et al. | | |
| 2012/0320711 A1 | 12/2012 | Hite | | |

(Continued)

OTHER PUBLICATIONS

International Search Report in related International Application No. PCT/EP2014/065977, dated Nov. 26, 2014.

(Continued)

*Primary Examiner* — Daniel L Murphy
(74) *Attorney, Agent, or Firm* — Patent Portfolio Builders PLLC

(57) ABSTRACT

Method and system for acquiring seismic data. The system includes a first streamer vessel configured to tow a first source array and a first streamer spread; a first source vessel configured to tow a second source array; and a second source vessel configured to tow a third source array. The first to third source arrays are distributed along a non-linear profile while the first streamer vessel and the first to second source vessels move along an inline direction (X).

20 Claims, 16 Drawing Sheets

(56) References Cited

U.S. PATENT DOCUMENTS

2013/0135966 A1    5/2013  Rommel et al.
2013/0188448 A1    7/2013  Siliqi et al.
2014/0081576 A1    3/2014  Grenie et al.

OTHER PUBLICATIONS

Written Opinion of the International Searching Authority in related International Application No. PCT/EP2014/065977, dated Nov. 26, 2014.

* cited by examiner

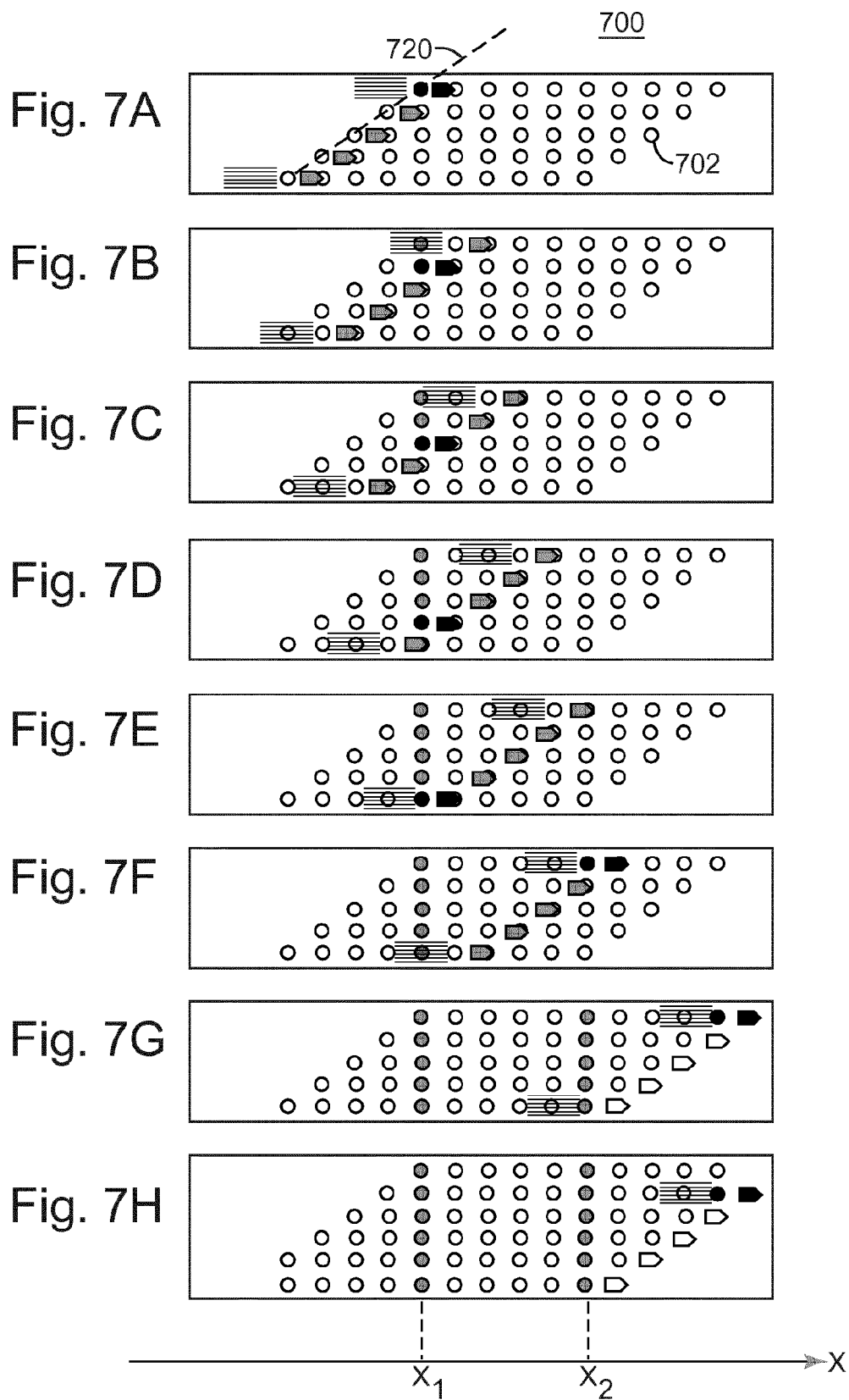

|  | Cross-line distance [m] (from S1) | Inline distance [m] (from S1) |
|---|---|---|
| S1 | 0.0 | 0.0 |
| S2 | 1200.0 | 330.0 |
| S3 | 2400.0 | 1110.0 |
| S4 | 3600.0 | 2790.0 |
| S5 | 4800.0 | 8220.0 |

MULTI-VESSEL SEISMIC ACQUISITION SYSTEM AND METHOD

CROSS REFERENCE TO RELATED APPLICATIONS

The present application claims the benefit of priority under 35 U.S.C. § 119(e) to U.S. Provisional Application No. 61/858,841, titled "Multi-Vessel Marine Acquisition Design for Efficient Full Azimuth and Long Offset Seismic Survey," filed on Jul. 26, 2013, and U.S. Provisional Application No. 61/977,285, titled "Non-linear Spatial Distribution of Seismic Sources for Richer Offset/Azimuth Distribution," filed on Apr. 9, 2014, and U.S. Provisional Application No. 61/927,200, entitled "Non-Linear Spatial Distribution of Seismic Sources for Richer Offset/Azimuth Distribution," filed on Jan. 14, 2014. The entire contents of each of the above documents are hereby incorporated by reference into the present application.

TECHNICAL FIELD

Embodiments of the subject matter disclosed herein generally relate to methods and systems for marine seismic data acquisition and, more particularly, to mechanisms and techniques for improved azimuth and/or offset distribution of acquired marine seismic data.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing better image of the subsurface is an ongoing process.

For a seismic gathering process, as shown in FIG. 1, a marine seismic data acquisition system 100 includes a survey vessel 102 towing a plurality of streamers 104 (one shown) that may extend over kilometers behind the vessel. One or more source arrays 106 may also be towed by the survey vessel 102 or another survey vessel (not shown) for generating seismic waves 108. Conventionally, the source arrays 106 are placed in front of the streamers 104, considering a traveling direction of the survey vessel 102. The seismic waves 108 generated by the source arrays 106 propagate downward and penetrate the seafloor 110, eventually being reflected by a reflecting structure 112, 114, 116, 118 at an interface between different layers of the subsurface, back to the surface 119. The reflected seismic waves 120 propagate upward and are detected by detectors 122 provided on the streamers 104. This process is generally referred to as "shooting" a particular seafloor 110 area.

One of the shortcomings of existing technology relates to the poor azimuth/offset distribution of the data collection points, i.e., detectors 122, positioned along streamers of equal length, and the number of streamers 104 attached to the survey vessel 102. Generally, a single survey vessel 102 tows approximately ten to sixteen streamers 104, of uniform length, with detectors 122 equally spaced along the length of each streamer. In this configuration, the azimuth of the collection points is narrow. The azimuth is defined as the angle made between a line that passes through the source and a recording receiver and the navigation path when viewed from above the source and the recording receiver. Narrow azimuth distribution (typical for a single vessel seismic survey) leads to problems associated with multiple (reflective) removals at locations on the streamers in close proximity to the source arrays 106. It should be noted that a survey vessel is limited in the number of streamers 104 it can tow.

Another shortcoming associated with existing acquisition methods relates to the collected data in relation to its intended use, i.e., different streamer collection configurations lend themselves to different uses of the data, such as multiple removal, imaging and model building. Narrow azimuth distribution streamer configurations are not focused on a specific use of the collected data, resulting in less than optimal seismic image results.

An acquisition method having better azimuth and offset distribution than the system shown in FIG. 1 is illustrated in FIG. 2 (which corresponds to FIG. 11 of U.S. patent application Ser. No. 13/748,062, the entire content of which is incorporated by reference herein), in which a seismic survey system 200 includes five vessels 202 to 210. Vessels 202 and 204 are configured to tow corresponding streamer spreads 212 and 214, respectively, and corresponding source arrays 202a and 204a, while each of vessels 206, 208 and 210 are configured to tow only a corresponding source array 206a, 208a and 210a, respectively. This system has the vessels 202 to 210 distributed along a straight line 220 so that each vessel has a different inline direction (traveling direction) at a given instant.

The azimuth distribution associated with seismic acquisition system 200, which is schematically shown in FIG. 3A, is illustrated in FIG. 3B, which exhibits holes 318. FIG. 3C shows the offsets associated with the system of FIG. 3A. FIG. 3B plots the azimuth (grey scale) versus the Y and X offsets between the sources and sensors while FIG. 3C shows the number of events (on the Y axis) for a given offset versus the offset (on the X axis).

Accordingly, it would be desirable to provide systems and methods that further reduce the azimuth gaps and provide a higher offset count of the collected seismic data.

SUMMARY

According to an embodiment, there is a marine seismic acquisition system that includes a first streamer vessel configured to tow a first source array and a first streamer spread; a first source vessel configured to tow a second source array; and a second source vessel configured to tow a third source array. The first to third source arrays are distributed along a non-linear profile while the first streamer vessel and the first to second source vessels move along an inline direction (X).

According to another embodiment, there is a marine seismic acquisition system that includes first to $n^{th}$ vessels, each configured to tow a corresponding source array of first to $n^{th}$ source arrays; and at least one vessel also configured to tow a corresponding streamer spread. The first to $n^{th}$ source arrays are distributed along a non-linear profile while the first to $n^{th}$ vessels move along an inline direction (X).

According to still another embodiment, there is a method for acquiring marine seismic data that includes towing one streamer spread with a streamer vessel; towing three source arrays with the streamer vessel and two source vessels; steering the streamer vessel and the two source vessels so that the three source arrays are located on a non-linear curve; firing the three source arrays according to a given firing sequence; and recording seismic data with seismic sensors located on the streamer spread as a result of firing the three source arrays.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7A-H illustrate a super-shot gather acquired with a multi-vessel marine seismic data acquisition system;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of two streamer vessels and three source vessels. However, the embodiments to be discussed next are not limited to this configuration, but may be extended to other arrangements that include more or fewer streamer vessels and/or source vessels. Also, the figures show a particular order of the streamer and source vessels along a cross-line direction. This order is exemplary and not intended to limit the embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, both the streamer vessels and the source vessels are distributed on a non-linear profile. For example, the streamer and source vessels, having different cross-line and inline positions one relative to another, (i.e., unique positions) are distributed along a non-linear profile. The non-linear profile may be any curved line. In one embodiment, the non-linear profile is a parameterized line.

The vessels may follow straight paths (pre-plot sail lines) or curved paths having amplitudes, periods and phases that may or may not be the same. The amplitudes, periods, and phases for the curved paths may be optimized to obtain better azimuth and offset diversity for the recorded data. However, it is possible that only the streamer vessels follow the curved path and the source vessels follow a straight line path, or the other way around, or any other combination, as long as the azimuth and/or offset distribution of the collected seismic data is improved relative to the existing acquisition systems, see for example, U.S Patent Application Publication No. 2013/0188448.

Figure 4:
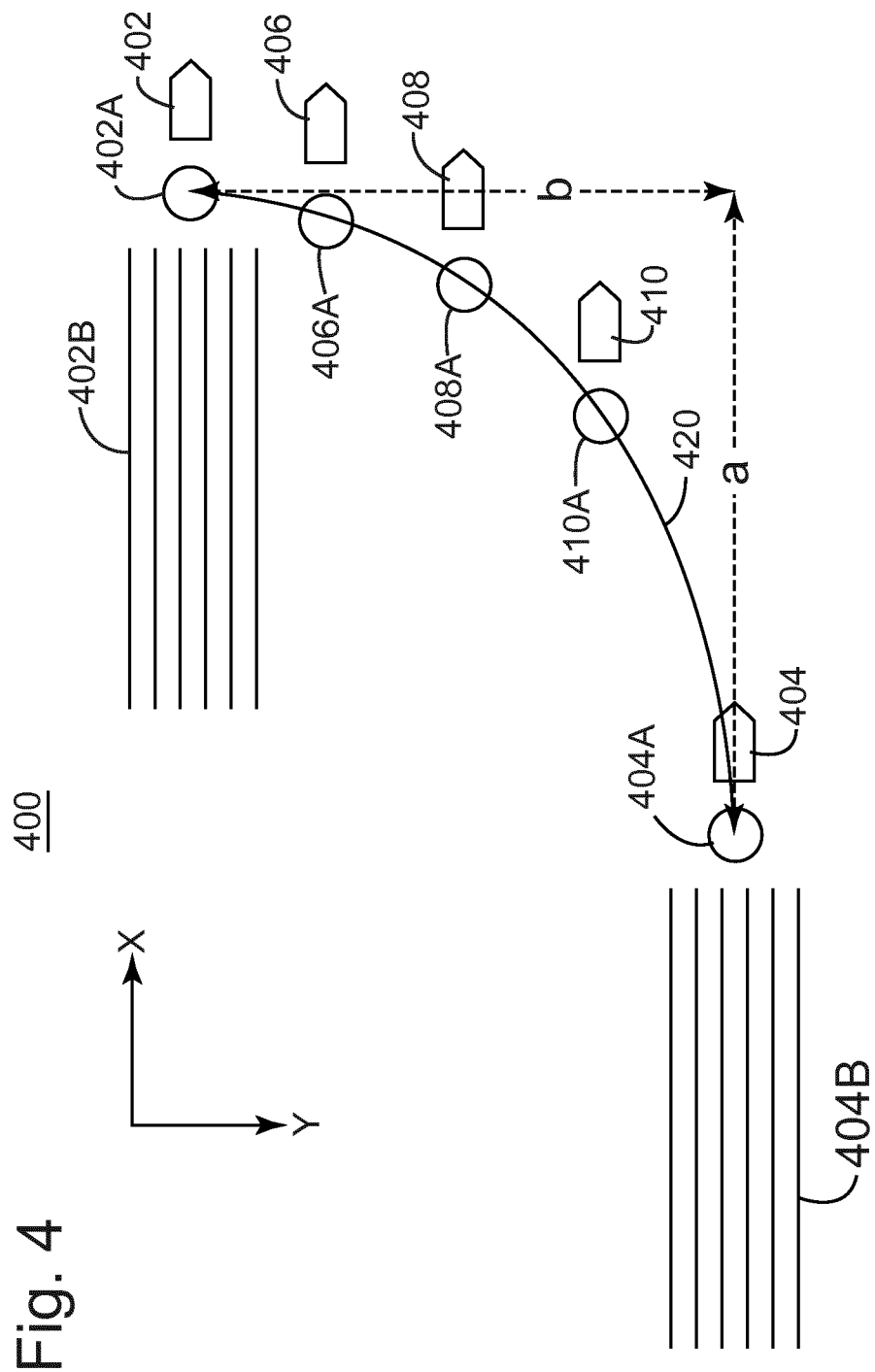
FIG. 4 is a schematic illustration of a multi-vessel marine seismic data acquisition system with source arrays distributed along a non-linear profile.

An example of a seismic acquisition system 400 is illustrated in FIG. 4, in which the acquisition system 400 is shown to include two streamer vessels 402 and 404 and three source vessels 406, 408 and 410. The streamer vessels 402 and 404 are towing corresponding streamer spreads 402B and 404B, respectively, and optionally, one or more seismic source arrays 402A and 404A, respectively. A source array may include one or more sub-arrays and a sub-array may include one or more source elements. A source element may be an air gun, a vibratory element, etc. A streamer vessel necessarily tows a streamer spread while a source vessel necessarily tows a source array. However, it is possible that the streamer vessel also tows a source array, as illustrated in FIG. 4, and a source vessel also tows a streamer spread. However, the embodiment of FIG. 4 shows source vessels 406, 408 and 410 towing only corresponding seismic sources 406A, 408A and 410A.

Figure 5A:
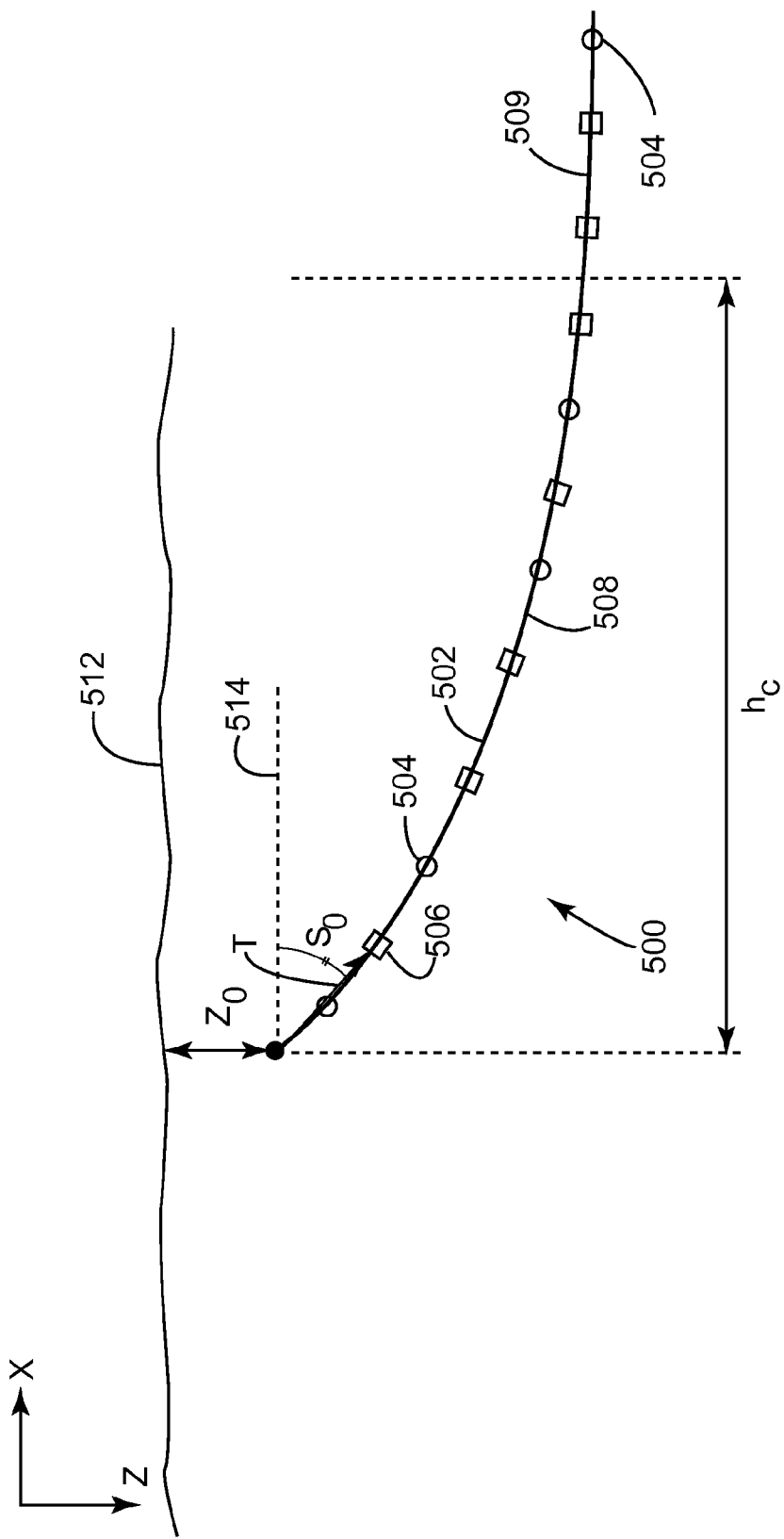
FIG. 5A illustrates a variable-depth streamer and FIG. 5B illustrates a multi-level source array.

Regarding the streamers, it is conventional to tow them at the same depth below the water surface or slanted relative to the water surface. However, a more modern arrangement is described with reference to FIG. 5A, in which the variable-depth streamer 500 includes a body 502 having a predetermined length, plural detectors 504 provided along the body, and plural birds 506 provided along the body for maintaining the selected curved profile. The streamer is configured to flow underwater when towed so that the plural detectors are distributed along the curved profile. The curved profile may be described by a parameterized curve, e.g., a curve described by (i) a depth $z_0$ of a first detector (measured from the water surface 512), (ii) a slope $s_0$ of a first portion T of the body with an axis 514 parallel with the water surface 512, and (iii) a predetermined horizontal distance $h_c$ between the first detector and an end of the curved profile. Note that the entire streamer does not need to have the curved profile. In other words, the curved profile should not be construed to always apply to the streamer's entire length. While this situation is possible, the curved profile may be applied to only a portion 508 of the streamer. In other words, the streamer may have (i) only a portion 508 with the curved profile or (ii) a portion 508 with the curved profile and a portion 509 with a flat profile, with the two portions attached to each other.

Figure 5B:
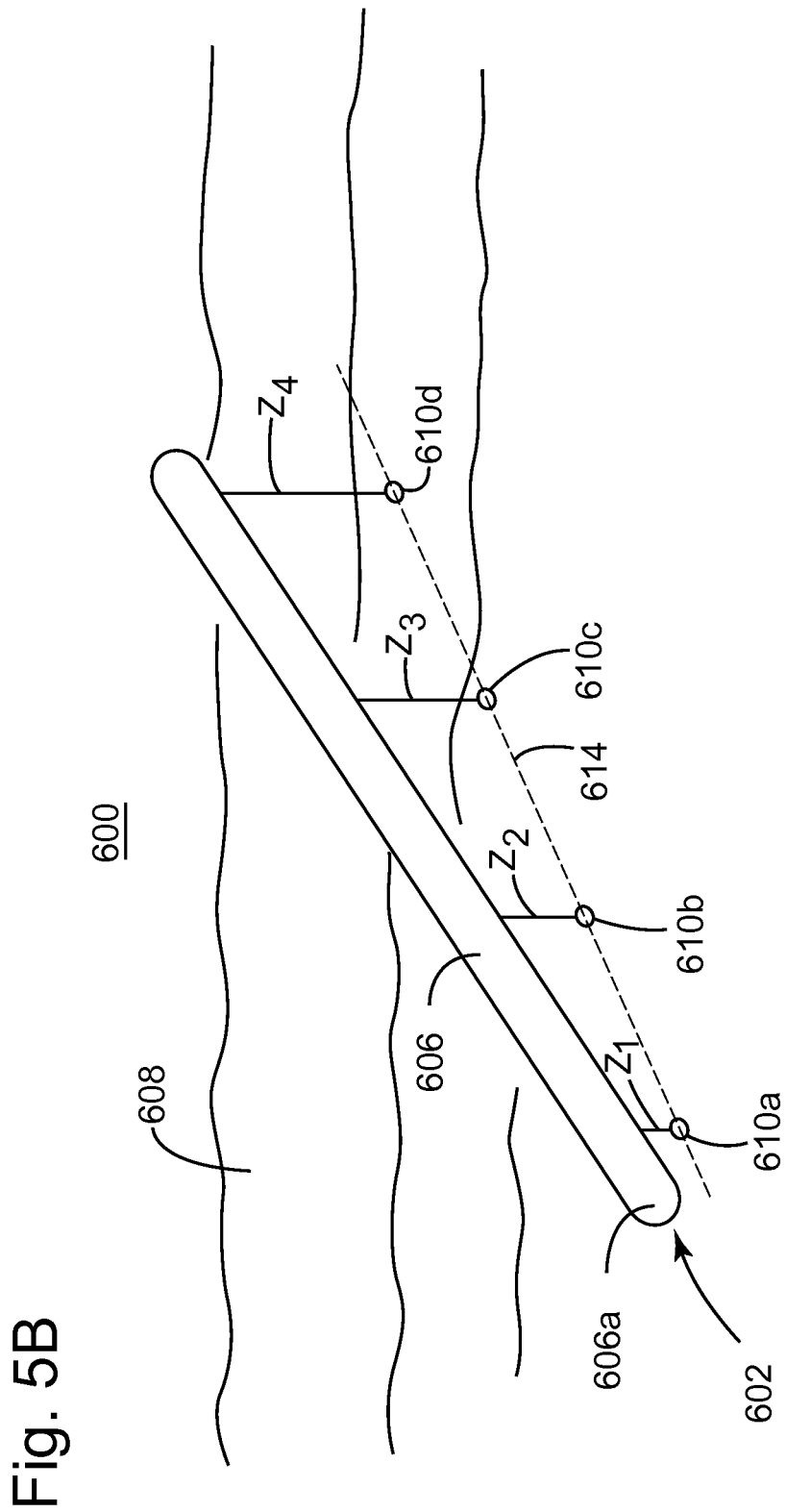

Regarding the sources, it is conventional to tow a source array that includes three sub-arrays. Each sub-array includes a float to which individual source elements are attached. Thus, all the individual source elements are located at a same depth. However, a more novel source array is presented in FIG. 5B. This source 600 includes one or more sub-arrays. FIG. 5B shows a single sub-array 602 that has a float 606 configured to float at the water surface 608 or underwater at a predetermined depth. Plural source points (or source elements) 610a-d are suspended from the float 606 in a known manner. A first source point 610a may be suspended closest to the head 606a of the float 606, at a first depth z1. A second source point 610b may be suspended next, at a second depth z2, different from z1. A third source point 610c may be suspended next, at a third depth z3, different from z1 and z2, and so on. FIG. 5B shows, for simplicity, only four source points 610a-d, but an actual implementation may have any desired number of source points. In one application, because the source points are distributed at different depths, they are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears to be a single sound signal.

The depths z1 to z4 of the source points of the first sub-array 602 may obey various relationships. In one application, the depths of the source points increase from the head toward the tail of the float, i.e., z1<z2<z3<z4. In another application, the depths of the source points decrease from the head to the tail of the float. In another application, the source points are slanted, i.e., provided on an imaginary line 614. In still another application, the line 614 is a straight line. In yet another application, the line 614 is a curved line, e.g., part of a parabola, circle, hyperbola, etc. In one application, the depth of the first source point for the sub-array 602 is about 5 m, and the greatest depth of the last source point is about 8 m. In a variation of this embodiment, the depth range is between 8.5 m and 10.5 m or between 11 m and 14 m. In another variation of this embodiment, when the line 614 is straight, the depths of the source points increase by 0.5 m from one source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

Returning to FIG. 4, each vessel is shown distributed along a non-linear profile 420, wherein the line extends between two vessels 402 and 404 that sandwich, along a cross-line direction Y, which is substantially perpendicular on an inline direction X (the traveling path), the other vessels 406, 408 and 410. In FIG. 4, the cross-line distance between adjacent vessels is shown to be identical. However, in one application, the cross-line distance may be different from vessel to vessel. For example, it is possible to increase the cross-line distance to reduce the acquisition time. In one embodiment, the two vessels 402 and 404 located at the ends of line 420 are the streamer vessels. However, in another embodiment, the positions of the two vessels 402 and 404 may be occupied by two source vessels or a combination of a streamer vessel and a source vessel. Note that in one application, the vessels of system 400 are staggered along the inline direction X, i.e., no two vessels have the same inline position (on X axis) at a given instant. The same is true for the cross-line direction (Y axis) in another application. In still another application, only three vessels are used, one streamer vessel and two source vessels or two streamer vessels and one source vessels. Note that a minimum number of vessels forming system 400 is three. One or more additional vessels may be added to this minimum configuration as long as they are distributed on non-linear profile 420. In one application, it is possible that at least three vessels are distributed on non-linear profile 420 while one or more vessels are distributed on a different profile.

Non-linear profile 420 may be a parameterized line, i.e., a line that is described by one or more mathematical equations. Examples of parameterized lines include a portion of a circle, parabola, ellipse, etc. However, any mathematical function may be used for describing the non-linear profile 420, e.g., polynomial, exponential, sinusoidal, etc. The choice of function may depend on the seismic target. In one application, two or more mathematical functions may be used to parameterize the non-linear profile 420. For example, it is possible to use two functions f1 and f2, one parameterized as a first straight line and the other parameterized as a second straight line, having a different slope than the first line. In other words, the non-linear profile 420 may be construed based on two linear functions having different slopes.

Figure 3A:
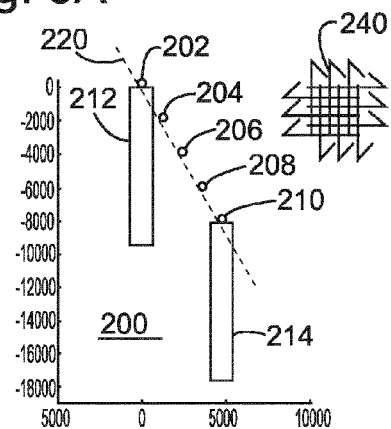
FIG. 3A schematically illustrates a multi-vessel marine seismic data acquisition system having the sources distributed along a linear profile.

If novel marine acquisition system 400 is compared to traditional marine acquisition system 200, the following advantages are observed for the novel system. For an accurate comparison, it is assumed that both systems 200 and 400 have the same overall number of vessels, the same number of source vessels, the same number of streamer vessels, the same source arrays, and the same streamer spreads. For the traditional system it is assumed that the streamer vessels are separated in the cross-line direction by 4.8 km and they are inline staggered by 8.22 km. The three source vessels are aligned and regularly spaced in between the streamer vessels as illustrated in FIG. 3A. The fleet of vessels sails along straight navigation lines separated by 0.6 km in anti-parallel acquisition mode and anti-symmetric mode (depending on the sail line heading, the multi-vessel spread is flipped with respect to the inline direction when changing the sail line). In order to achieve a rich azimuth distribution, this pattern illustrated in FIG. 3A is acquired in two orthogonal directions (e.g., North-South and East-West), as illustrated by symbol 240 in FIG. 3A.

Figure 6A:
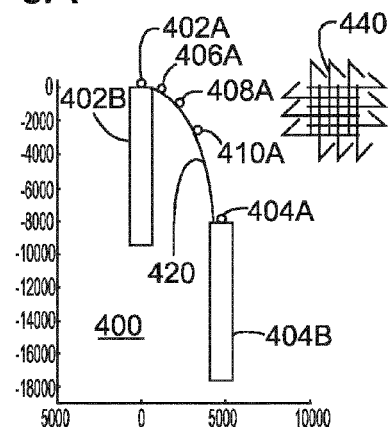
FIG. 6A schematically illustrates a multi-vessel marine seismic data acquisition system having the sources distributed along a non-linear profile.

In the novel system 400, represented in FIG. 6A next to FIG. 3A for easy comparison, all acquisition parameters remain identical as for system 200, except that the seismic sources are now distributed along the non-linear profile 420 instead of the linear profile 220. In this specific example, non-linear profile 420 is an arc of ellipse. However, as discussed above, any mathematical function or functions can actually be used for describing the non-linear profile.

Figure 6B:
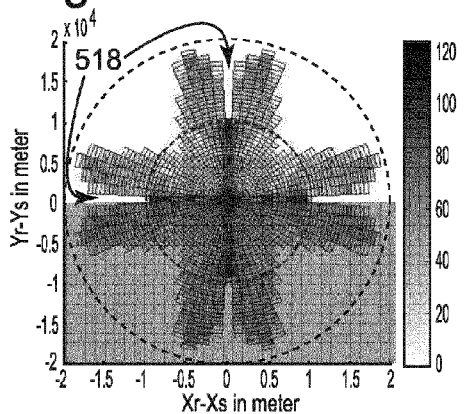
FIG. 6B illustrates associated offset/azimuth distribution of recorded seismic data.
Figure 6C:
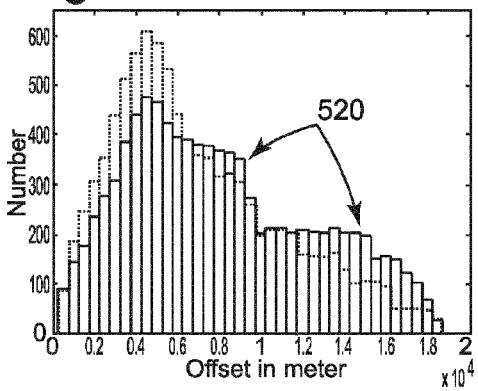
FIG. 6C illustrates an offset distribution of the recorded seismic data.

FIG. 6B shows the rose plot (reciprocity applied) for the azimuth distribution of system 400. An inspection of FIG. 6B shows that the distribution of the seismic sources along non-linear profile 420 reduces the size of the holes 518 in the North-South and East-West direction compared to holes 318 in FIG. 3B. FIG. 6C, which plots the offset distribution of the sources to receivers, shows that system 400 achieves a higher offset count 520 in the mid and far offset ranges (6-9 km and 12-18 km for the specific numbers used in this example).

To preserve the construction of the super-shot gathers and the associated regular shot grid, the positions of the seismic sources have to be repeated from one acquisition line to another. Note that a super-shot gather may be obtained by combining, for a given geographical shot point location, various individual shot gathers acquired from successive gather lines. If the system illustrated in FIG. 4 is used, a super-shot gather for a given acquisition direction is composed by five individual shot gathers For achieving that, the distribution of the seismic sources in the inline direction has to be carefully calculated as it depends on the shooting sequence, the function choice for the non-linear curve and the linear shot point interval D (i.e., the distance sailed by the whole fleet along the inline direction between consecutive firings of two source arrays).

For simplicity, an example of wide-azimuth acquisition system having the sources distributed on a linear profile is now discussed with regard to FIGS. 7A-H. This example preserves the construction of the super-shot gathers and a regular shot grid (represented by empty circles) as shown in the figures. FIG. 7A shows a marine acquisition system 700 that is similar to system 200. The sources are distributed along a linear profile 720. Empty dots 702 in the figures represent the shooting grid, and a dark dot represents a source being actuated. If the sources are labeled S1 to S5, with S1 being at the top and S5 at the bottom of each figure, FIG. 7A shows source S1 being fired at inline position X1. Then, the fleet moves by a given distance (e.g., the D interval, not shown in the figures but understood to be the distance between two adjacent empty dots along the travel path) and source S2 is being fired as shown in FIG. 7B, at the same inline position X1. Next, the fleet continues to move and when a new D distance is achieved, source S3 fires as shown in FIG. 7C. These steps are repeated until each source has been fired, as shown in FIGS. 7D and 7E. At this instant, all sources S1 to S5 have fired as the same inline position X1. This represents a firing sequence. Next, source S1 is fired after the fleet has moved another D distance, as illustrated in FIG. 7F. FIG. 7G shows a second shooting sequence being shot at inline position X2 and FIG. 7H shows the acquisition being repeated along an adjacent sail line, i.e., the entire fleet has been shifted along the cross-line direction by a given distance. Note that a firing shooting sequence may include all the sources in a given order and with a given time or distance delay. In the example illustrated in FIGS. 7A-H, the source order in the firing sequence is S1, S2, S3, S4, S5 with a distance delay of D between any two consecutive source firings. This configuration and shooting scheme allows the construction of the super-shot gathers on a regular shot grid.

Figure 8:
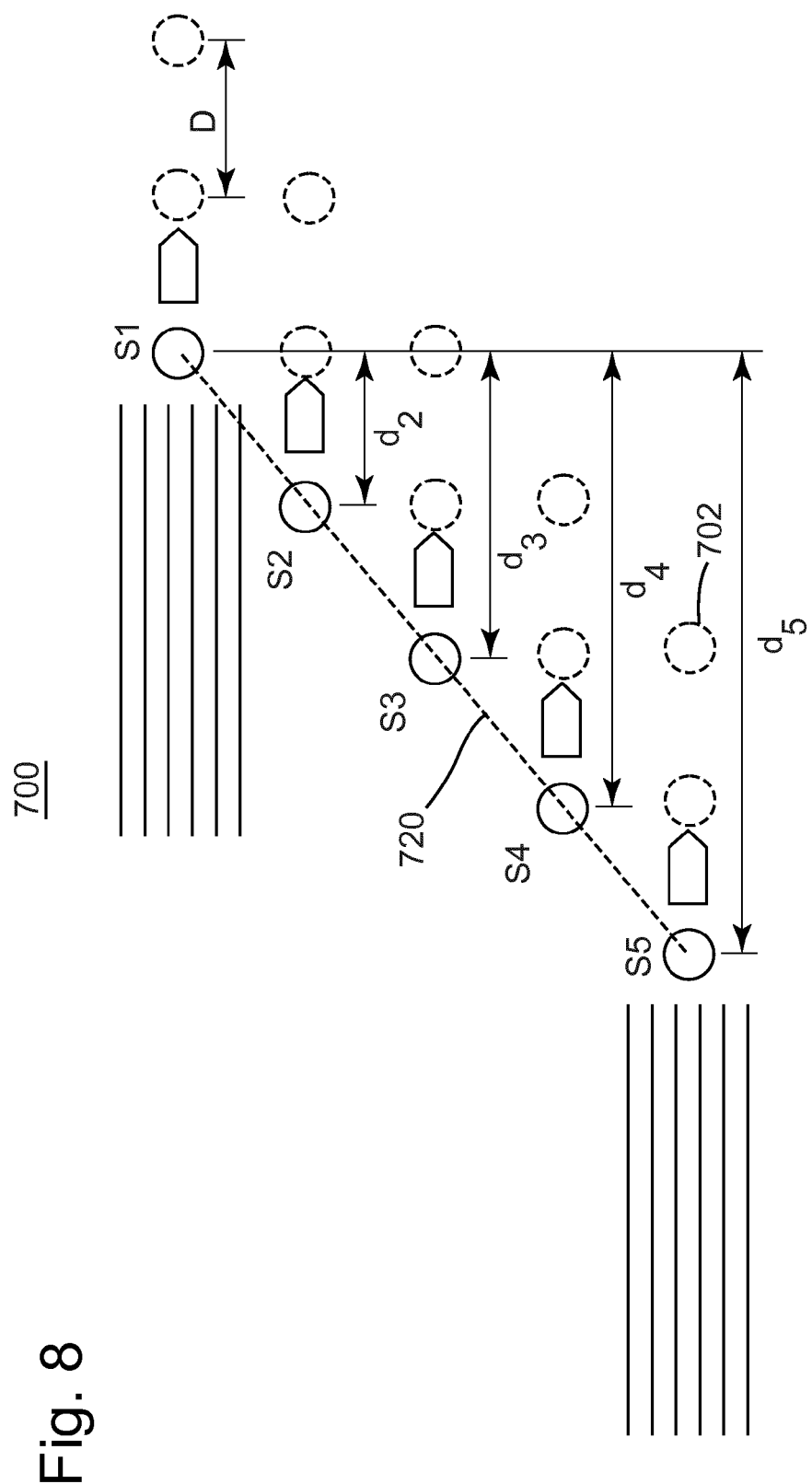
FIG. 8 is a schematic illustration of a multi-vessel marine seismic data acquisition system with source arrays distributed along a linear profile.

A generic rule for positioning the vessels/sources is now described. Let k be the rank of the activated source in the shooting sequence, D the linear shot point interval (i.e., the distance sailed by the acquisition spread between two successive shots), and $n_s$ the number of seismic sources. The inline distance $d_k$ between the first source in the shooting sequence and the other sources is defined as follows:

$$d_k = m_k(n_s \times D) + (k-1)D, \quad 1 \le k \le n \quad (1)$$

where $m_k$ is an arbitrary integer (positive, negative or null) and depends on the mathematical function describing source distribution line 720. Distances D and $d_k$ are illustrated in FIG. 8 for a linear profile 720. Note that all the sources are aligned with the following condition $m_k(k-1) = m_2, \forall k > 2$. The example of FIG. 8 has $m_2 = 0$, $d_2 = D$, $d_3 = 2D$, $d_4 = 3D$ and $d_5 = 4D$.

Figure 9A:
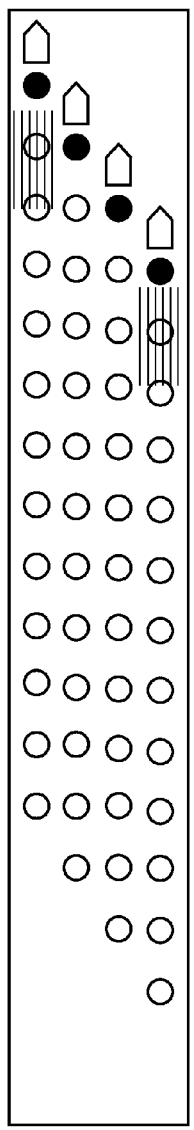
FIGS. 9A-D illustrate a multi-vessel marine seismic data acquisition system with various source distributions.
Figure 9B:
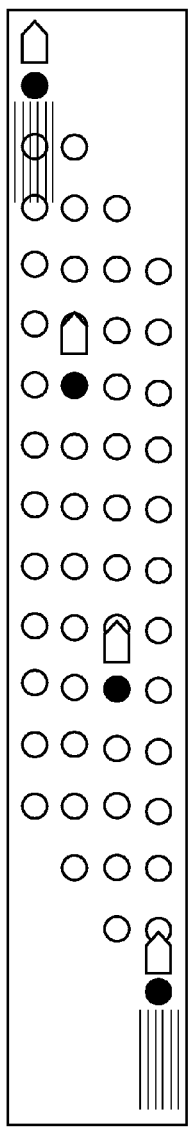
Figure 9C:
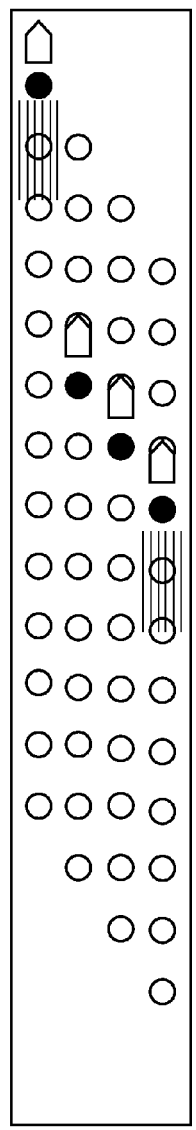
Figure 9D:
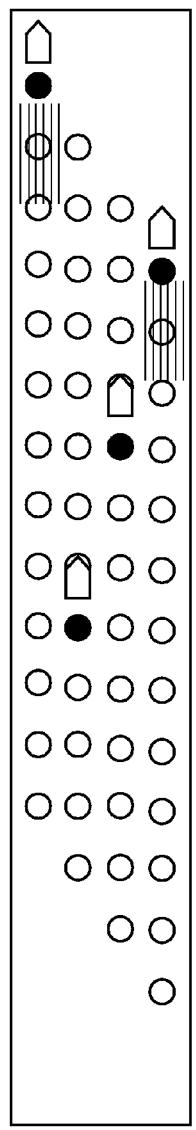

FIGS. 9A-D illustrate different examples of source distribution having different values for $m_k$. More specifically, FIG. 9A shows the sources being aligned along a straight line and having parameters $m_2 = m_3 = m_4 = 0$, $d_2 = D$, $d_3 = 2D$ and $d_4 = 3D$, FIG. 9B shows the sources being aligned along a straight line and having parameters $m_2 = 1$, $m_3 = 2$, $m_4 = 3$, $d_2 = 5D$, $d_3 = 10D$ and $d_4 = 15D$, FIG. 9C shows the sources not being aligned along a straight line and having parameters $m_2 = m_3 = m_4 = 1$, $d_2 = 5D$, $d_3 = 6D$ and $d_4 = 7D$, and FIG. 9D shows the sources not being aligned along a straight line and having parameters $m_2 = 2$, $m_3 = 1$, $m_4 = 0$, $d_2 = 9D$, $d_3 = 6D$ and $d_4 = 3D$. Note that the marine acquisition system shown in FIGS. 9A-D has only four sources that are shot in the following firing sequence: S1, S2, S3, S4.

Figure 10A:
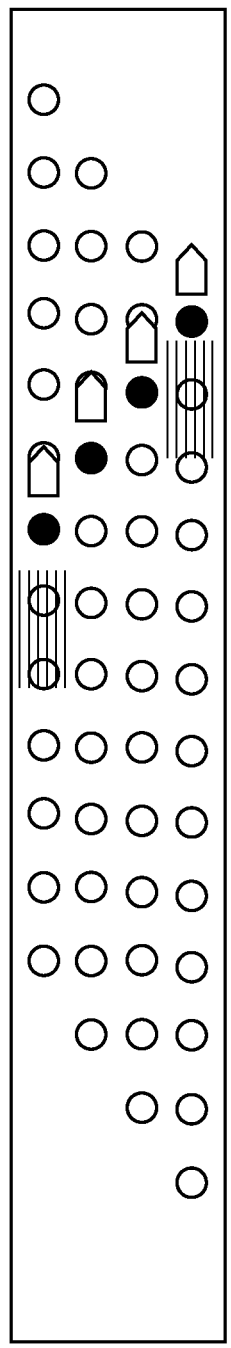
FIGS. 10A-B illustrate a multi-vessel marine seismic data acquisition system with various shooting sequences.
Figure 10B:
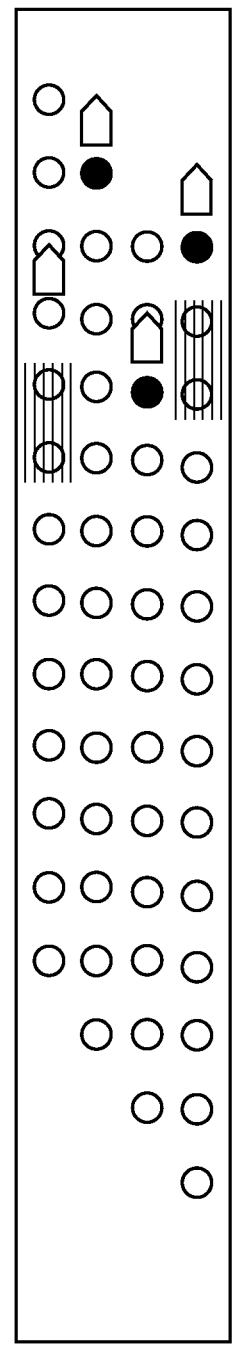

FIGS. 10A-B show source distributions having different shooting sequences, i.e., FIG. 10A shows the system having firing sequence S4, S3, S2 and S1 with $m_2 = m_3 = m_4 = 0$, $d_2 = D$, $d_3 = 2D$ and $d_4 = 3D$ and FIG. 10B shows the system having firing sequence S2, S4, S1, and S3 with $m_2 = m_3 = m_4 = 0$, $d_2 = D$, $d_3 = 2D$, and $d_4 = 3D$. Remembering that index k in equation (1) denotes the position of a given source in the firing sequence and that FIG. 10A has firing sequence: S4, S3, S2, S1, d2 is the distance between S4 and S3, d3 is the distance between S4 and S2 and d4 is the distance between S4 and S1. For FIG. 10B, considering the source sequence S2, S4, S1, S3, d2 is the distance between S2 and S4, d3 is the distance between S2 and S1, and d4 is the distance between S2 and S3.

For the marine acquisition systems that have the sources distributed along a non-linear profile, as shown, for example, in FIG. 4, the positions (inline and/or cross-line) for each source may be calculated as now discussed, so that the acquired seismic data preserve the construction of the super-shot gathers on an associated regular shot grid. Taking the particular case illustrated in FIG. 4, i.e., the seismic sources distributed along an arc 420 of an ellipse, the calculated positions of the sources are derived based on the canonical equation of the ellipse:

$$\frac{x^2}{a^2} + \frac{y^2}{b^2} = 1, \quad (2)$$

where x and y are the coordinates along the inline and cross-line directions, respectively.

Denoting a the inline (staggered) distance between the two outer sources 402A and 404A, as illustrated in FIG. 4, and b the cross-line distance between the sources of the two outer streamer vessels, taking into account equation (1), and assuming that the source 402A of the first streamer vessel 402 is the first activated source in the shooting sequence and the source 402B of the second streamer vessel 404 is the last activated source in the shooting sequence, the staggered distance a, derived from equation (1), has to honor the following condition:

$$a = D(n_s \times (m_{n_s}+1)-1). \qquad (3)$$

Knowing the cross-line positions ($y_2$, $y_3$, $y_4$) of the inner seismic sources S2, S3 and S4 (because the sources are equidistant along the cross-line direction), the calculated inline positions ($x_2$, $x_3$, $x_4$) are obtained from equation (2). Then, the distance ($x_k - x_1$) is rounded to the closest value given by condition (1).

Figures 11A, 11B:
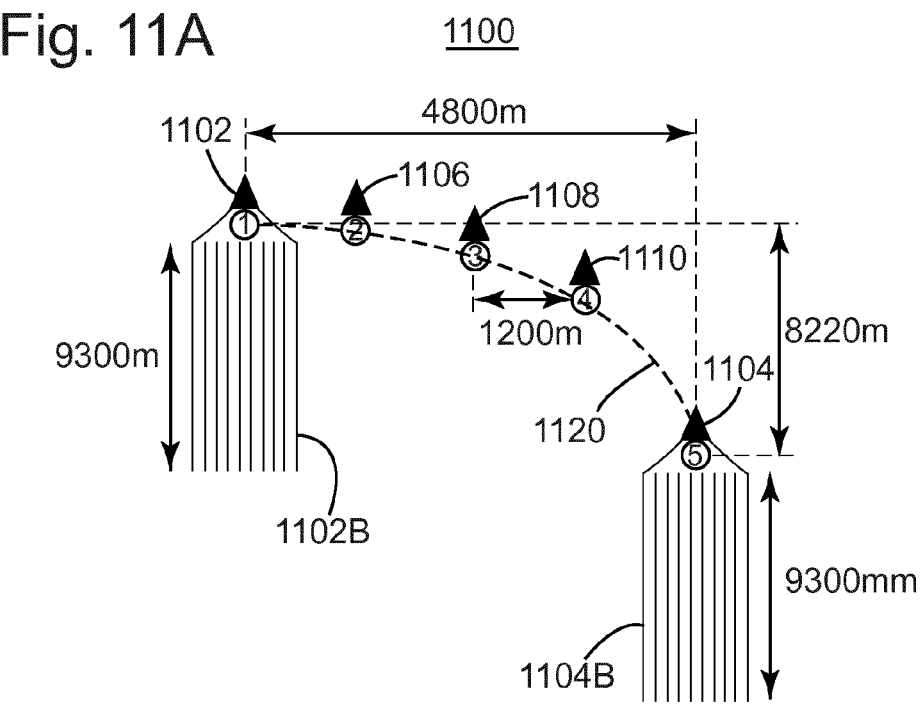
FIG. 11A illustrates a multi-vessel marine seismic data acquisition system with source arrays distributed along a non-linear profile and FIG. 11B shows the distances between the source arrays.

To implement the above equations in a practical example, consider with regard to FIG. 11A, a marine acquisition system 1100 that has five seismic vessels 1102 to 1110, each vessel towing a corresponding source S1 to S5, and vessels 1102 and 1104 also towing corresponding streamer spreads 1102S and 1104S. Choosing b=4800 m, a=8220 m and D=30 m and the following firing sequence: {S1, S2, S3, S4, S5}, the position of source S2 can be now computed. The cross-line coordinate $y_2$ is known: $y_2$=1200 m. The inline coordinate $x_2$ is derived from equation (2):

$$x_2 = a\sqrt{\left(1 - \frac{y_2^2}{b^2}\right)} = 7959.0 \text{ m}$$

Then, it is possible to compute quantity $\widetilde{m_2}$ from equation (1), which is then rounded to the nearest integer value:

$$\widetilde{m_2} = \frac{(a-y_2)-D}{n_s D} = 1.54 \Rightarrow m_2 = 2$$

Replacing $m_2$ into equation (1), the inline offset between the second source S2 and the first source S1 is found to be:

$$d_2 = 330 \text{ m}.$$

In the same way, it is possible to compute the inline offsets of sources S3 and S4, which result in $$d_3 = 1110 \text{ m with } m_3 = 7,$$

and $$d_4 = 2790 \text{ m with } m_4 = 18.$$

The acquisition geometry calculated above for the non-linear profile being an arc of an ellipse is shown in FIG. 11A and the associated cross-line and inline positions are illustrated in FIG. 11B.

Thus, depending on the mathematical function that is chosen to describe the non-linear profile 1120, the inline positions of each source can be accurately calculated so that the acquired seismic data preserve the construction of the super-shot gathers on an associated regular shot grid.

Figure 3B:
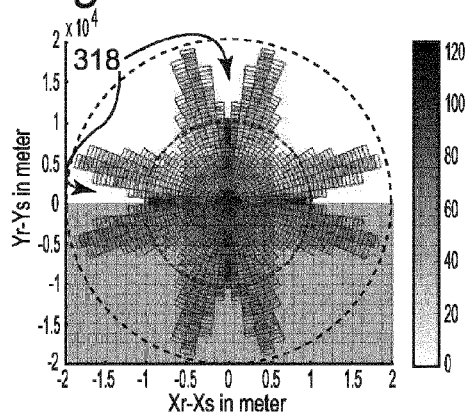
FIG. 3B illustrates associated offset/azimuth distribution of recorded seismic data.
Figure 3C:
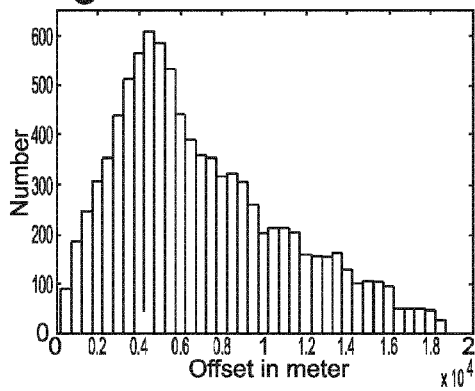
FIG. 3C illustrates an offset distribution of the recorded seismic data.

Returning now to the comparison of FIGS. 3A-C with FIGS. 6A-C, it was noted in those embodiments that the only parameter that has changed was the profile of the source distribution line, i.e., the replacement of the linear profile 220 with the non-linear profile 420. However, as discussed now, when employing the novel non-linear profile 420, it is possible to implement larger cross-line distances between the seismic vessels so that the surveying area is covered faster using a reduced number of acquisition sail lines comparative to a traditional survey. Further, one or more of the embodiments to be discussed next take advantage of the economy of the acquisition sail lines to deploy extra WAZ passes with different azimuths. In other words, if a traditional survey requires 100 sail lines (a hypothetical number), the novel system, by having larger cross-line distances between the vessels, needs only 75 sail lines, and the remaining 25 sail lines may be used to acquire another sailing direction along the survey area. In one application, it is possible to use continuous recording to speed up the firing sequences of the plurality of sources, resulting in a higher shot density and blended seismic records. Note that all these features may be used by themselves or in combination with these or other features discussed in this application.

Figure 1:
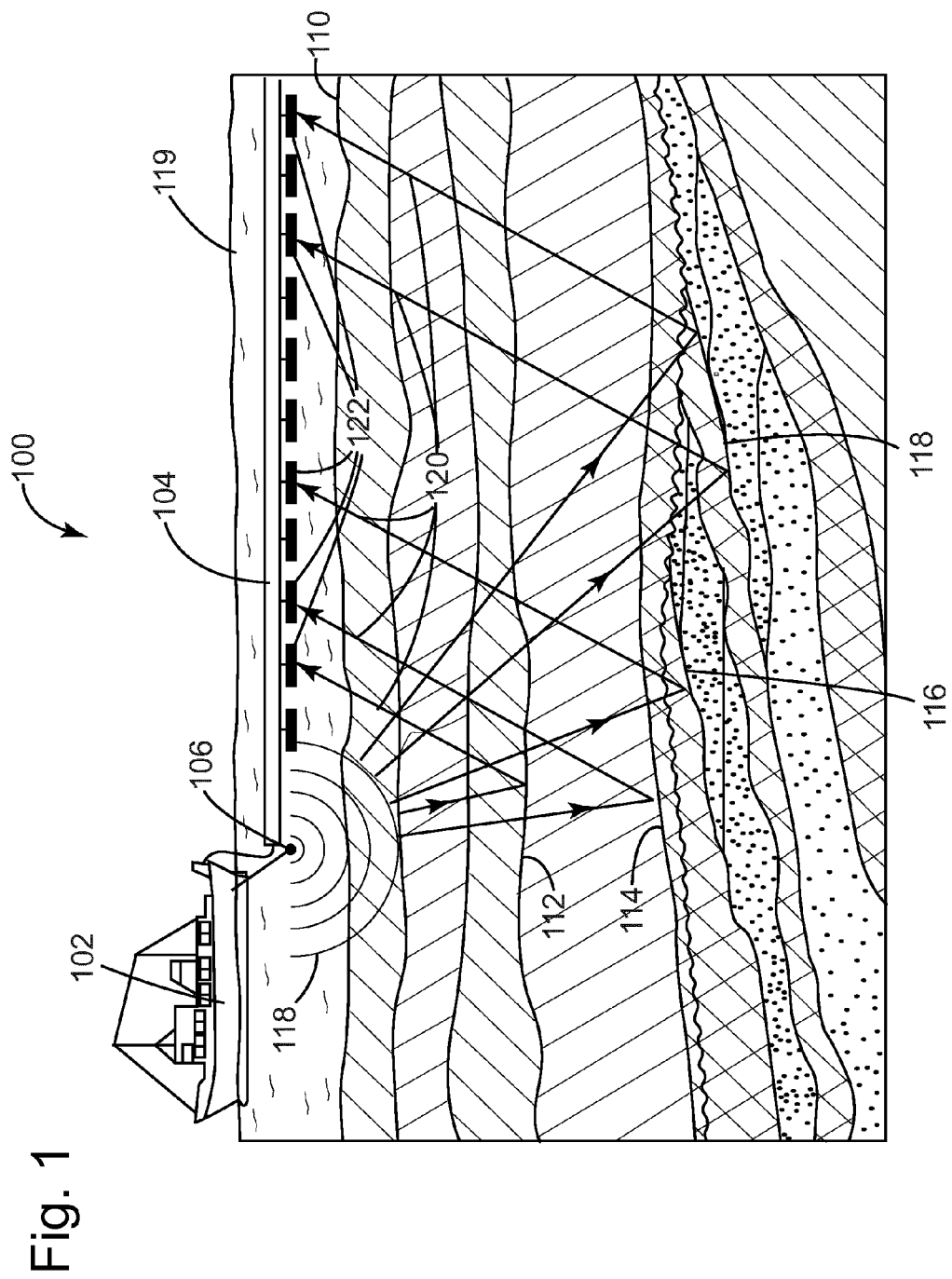
FIG. 1 is a schematic illustration of a marine seismic data acquisition system.
Figure 2:
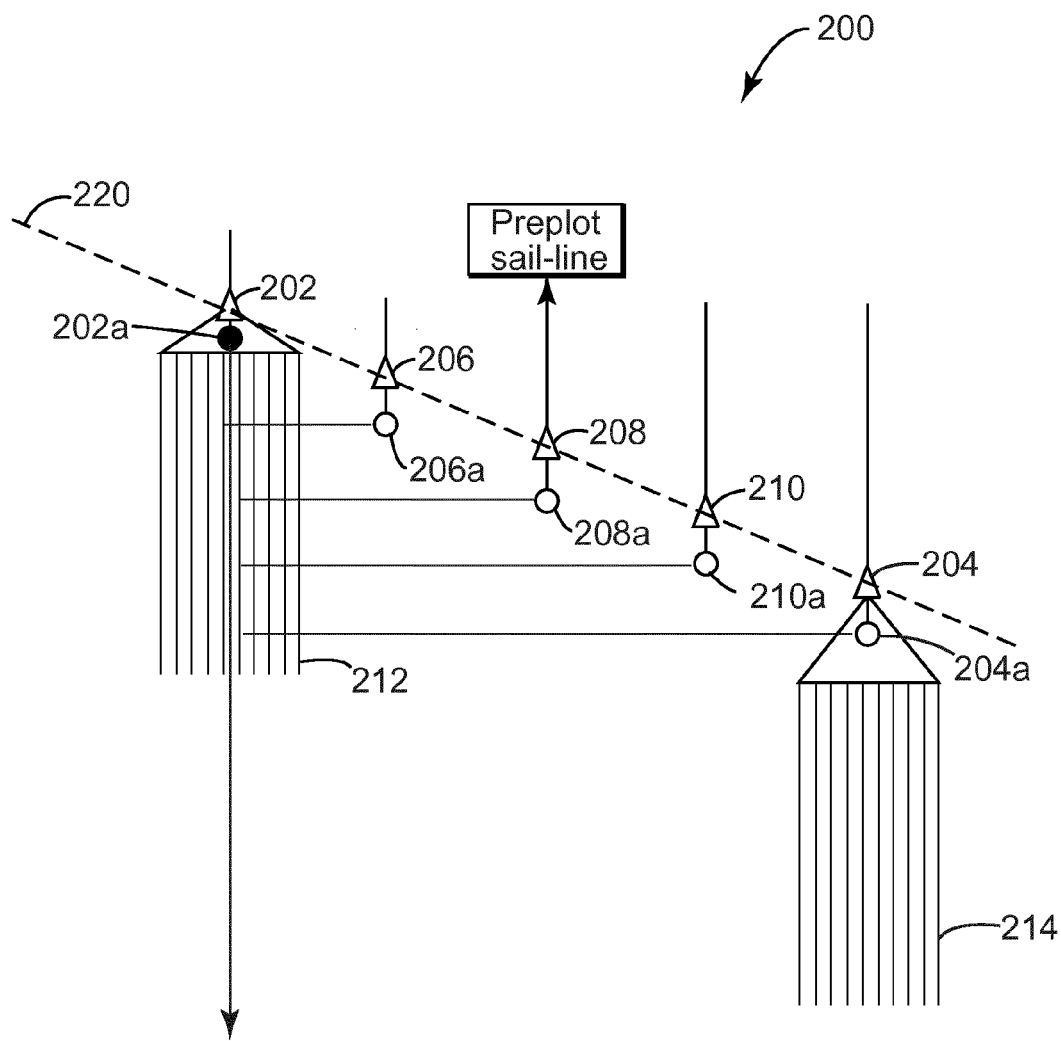
FIG. 2 is a schematic illustration of a multi-vessel marine seismic data acquisition system.

An advantage of a novel acquisition system 1200 is illustrated by comparison with system 200 presented in FIGS. 2-3C. For the sake of comparison, FIGS. 3A-C are reproduced as FIGS. 12A-C, next to FIGS. 12D-F that illustrate the novel system 1200. Note that this description remains valid whatever the number of seismic vessel, the number of acquisition directions, the vessel distribution along the inline direction (staggered), the streamer deployment (flat streamer, variable depth streamer, multi-sensor streamer, etc.), their number and spacing (fanning), the source number (flip-flop) and source-sampling grid.

Figure 12A:
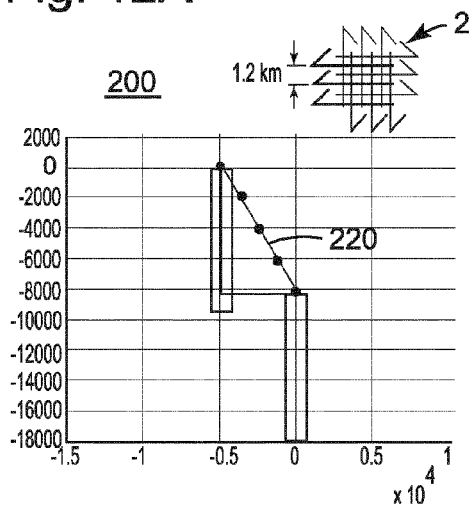
FIG. 12A schematically illustrates a multi-vessel marine seismic data acquisition system having the sources distributed along a linear profile.
Figure 12D:
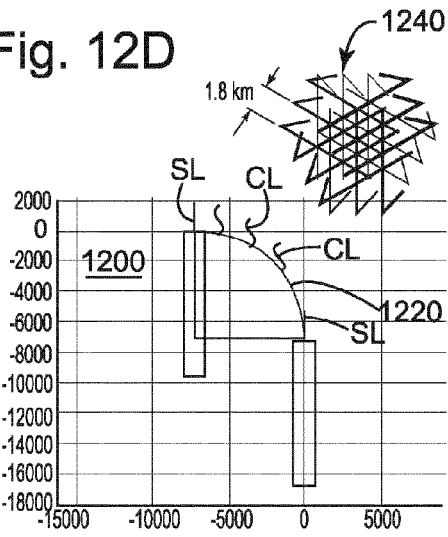
FIG. 12B illustrates associated azimuth distribution of recorded seismic data.
FIG. 12C illustrates an offset distribution of the recorded seismic data, FIG. 12D schematically illustrates a multi-vessel marine seismic data acquisition system having the sources distributed along a non-linear profile.
FIG. 12E illustrates associated azimuth distribution of recorded seismic data.
FIG. 12F illustrates an offset distribution of the recorded seismic data.

FIG. 12A illustrates traditional system 200 having five sources distributed along a straight line 220 while FIG. 12D illustrates the novel system 1200 having five sources distributed along a non-linear profile 1220. The paths followed by each vessel in FIG. 12D are displayed either as straight lines SL or as curved lines CL. Note that all vessels in FIG. 12A follow straight line paths. In both systems, the fleet is made of five vessels: two outer vessels tow a source and a streamer spread (10 streamers each having a length of 9 km with 120 m separation between adjacent streamers) and the three inner vessels tow only sources.

In the system 200, streamer vessels are separated in the cross-line direction by 4.8 km and are inline staggered by 8.52 km while the three source vessels are aligned along straight line 220 and regularly spaced in between streamer vessels. The fleet sails along straight navigation lines separated by 1.2 km in anti-parallel acquisition mode and anti-symmetric mode (depending on the sail line heading, the multi-vessel spread is flipped along with respect to the inline direction). In order to achieve a rich azimuth distribution, this pattern is acquired in two orthogonal directions (e.g., North-South and East-West) as indicated by reference number 240.

In the novel system 1200, the cross-line distance between the streamer vessels is enlarged by ⅓ (i.e., from 4.8 km to 7.2 km) and the source vessels sail along undulating paths CL. For example, one undulating path has a 1.8 km period and 0.8 km peak-to-peak amplitude. Other values for these parameters may be selected to statistically fill-in the gaps generated while the streamer vessels progress along straight paths SP. The streamer vessels follow straight line paths to preserve the signal-to-tow-noise ratio and existing processing workflow. In one application, the streamer vessels may follow undulating paths. In another application, the inline offset between the streamer vessels is reduced from 8.52 km to 7.2 km. Other numbers may be used depending on the type of seismic survey.

The wider WAZ system 1200 illustrated in FIG. 12D allows increasing the separation between sail line (from 1.2 km to 1.8 km). Also, for a given acquisition direction, the number of sail lines necessary to cover the survey can then be reduced with the same ratio. Thus, for the same cost (i.e., full survey duration) an extra direction of acquisition with another azimuth can be acquired for system 1200 when compared to system 200 as illustrated by symbol 1240. Thus, for the same cost, three azimuthal directions could be acquired, instead of two as in system 200.

Figure 12B:
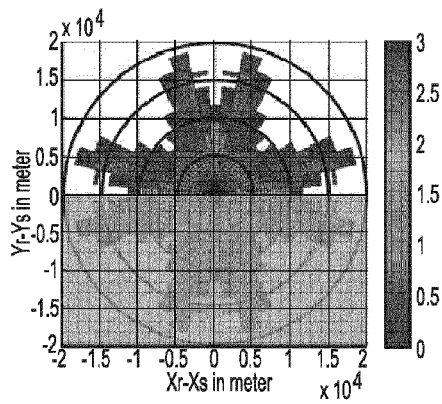
Figure 12E:
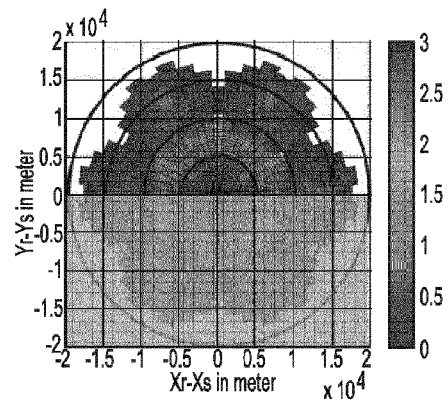
Figure 12C:
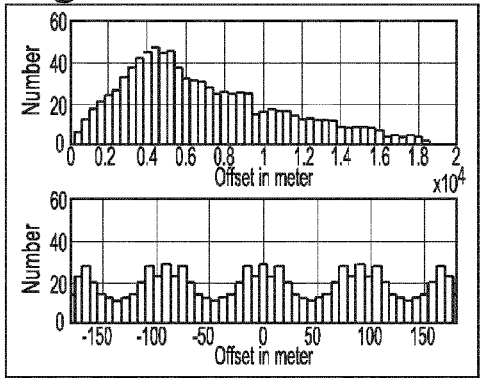
Figure 12F:
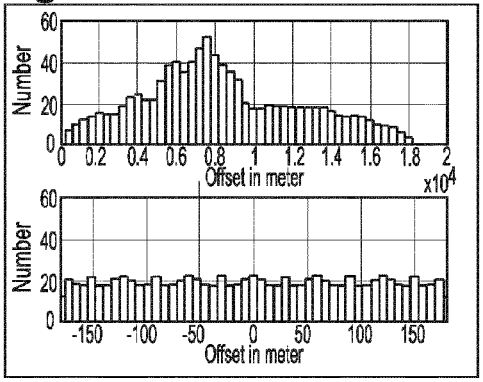

Enhancements of the azimuth distribution in system 1200 are illustrated by comparing FIG. 12B with FIG. 12E. The rose-plots of FIGS. 12B and 12E (reciprocity applied) show a net improvement of full azimuth aspect for a larger range of offsets and particularly for offsets beyond 10 km. The histograms illustrated in FIGS. 12C and 12F also illustrate an improvement of offset and azimuth distributions.

Figure 13A:
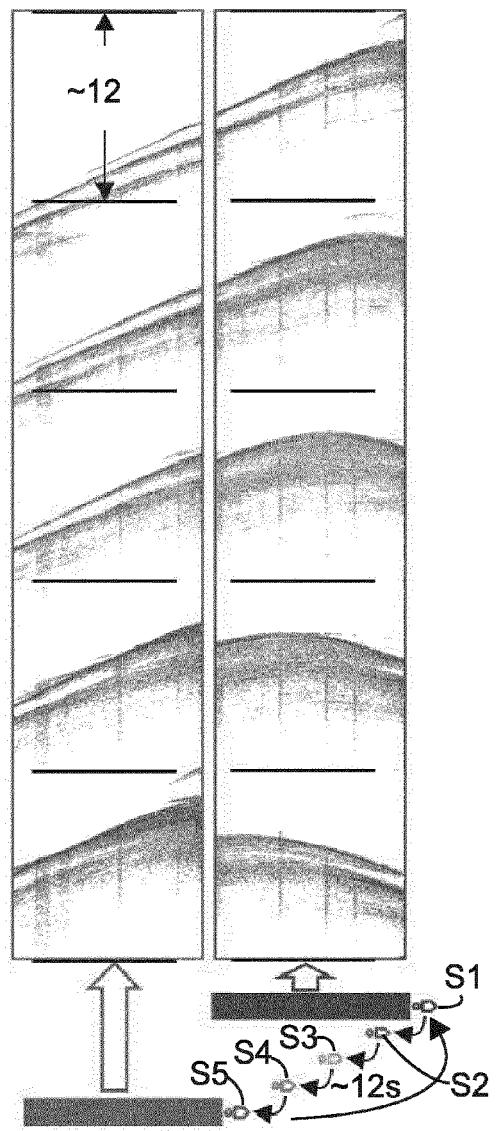
FIG. 13A illustrates traces recorded by a traditional seismic data acquisition system and FIG. 13B illustrates traces recorded with a seismic data acquisition system that fires the sources at shorter time intervals.

According to another embodiment, it is possible to obtain a denser shot distribution at the same survey cost (i.e., using a same system traditional system) by shooting the sources with shorter time delays. More specifically, FIG. 13A shows a traditional system 200 having five sources and two streamer spreads being towed and associated recorded seismic data recorded by each seismic spread. The traditional system 200 fires each source during a firing sequence, for example, S1 to S5 with a firing time delay of about 12 s. Thus, a full cycle takes about 60 s and about 150 m. Then, the system fires a second sequence and so on as discussed above with regard to FIGS. 7A-H. The recorded seismic sequences per each shot are relatively well separated, without overlaps of source generated wavefields, as illustrated in FIG. 13A.

Figure 13B:
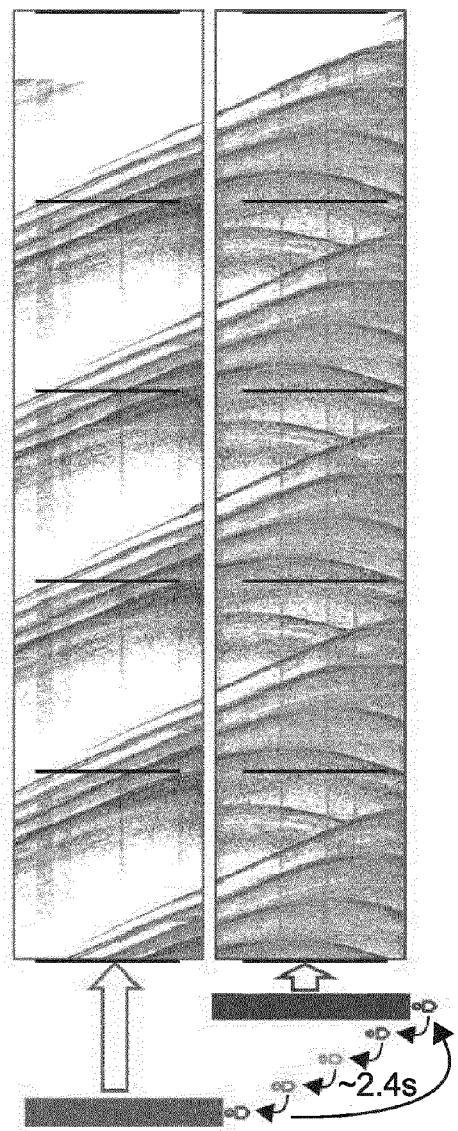

For the denser system shown in FIG. 13B, the firing sequence remains the same, but the time delay between two consecutive shots is reduced to about 2.4 s. Other times may be used and they slightly change from one shot to another. The resulting recorded seismic wavefields generated by different sources are significantly overlapped ("continuous blending") and they could only be recorded using a continuous recording system. In this particular case, the use of continuous recording technique allows increasing the shot density by a factor five without increasing the acquisition cost (survey time duration).

The time delay between two successive shots is mainly controlled by the spatial shot interval along the navigated lines (inline) and the speed of the seismic vessels. Then, depending on the acquisition context and the objectives of the survey, the time delay can be optimized by adjusting the vessel speed and the inline shot sampling. Those skilled in the art would recognize that other shooting strategies can be considered, for example, all the sources can be activated (quasi) simultaneously, or the sources can be activated by pairs as in the following firing sequence: {S1S3, S2S4, S5S1, S2S4, S3S5}. Other combination of sources can be considered, e.g., a mixed acquisition as disclosed in U.S. Patent Application Publication No. 2014/0081576.

To avoid critical overlaps of recorded source wavefields, the firing sequence order can also be adjusted accordingly. Seismic modeling of the interferences of brightest reflections (such as water bottom) with critical geological horizons allows the optimization of firing sequences order. In one application, the inline arrangement of the sources need also to be modified. For some source separation algorithms it is possible to introduce perturbations in the timing of the firing sequence. This approach allows to encode the source in time and this helps the deblending process. Other encoding techniques in time and space can be used (e.g., popcorn source, firing by sequence of pairs, etc.

Figure 14:
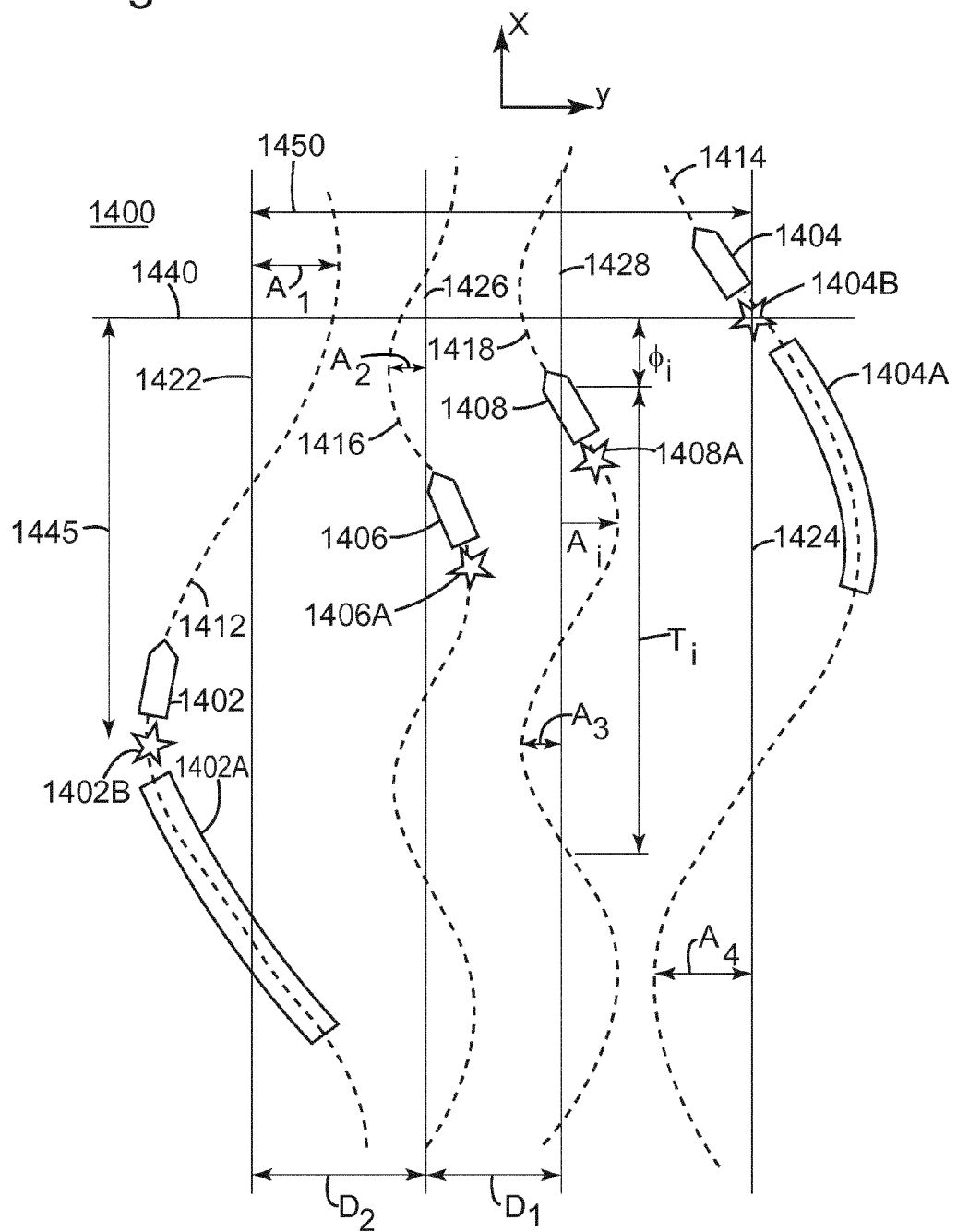
FIG. 14 illustrates a marine seismic data acquisition system in which each vessel follows an undulating path.

It has been discussed above that one or more of the vessels (source or streamer vessels) may follow an undulating path. Such system 1400 in which all the vessels are following corresponding undulating paths is illustrated in FIG. 14. An undulating path is periodic in space, i.e., has a shape that repeats itself after a certain length (wavelength). An undulating path may include other curved paths, for example, a path that is periodic in time, etc. In the embodiment of FIG. 14, the streamer vessel 1402 follows undulating path 1412, streamer vessel 1404 follows undulating path 1414, source vessel 1406 follows undulating path 1416 and source vessel 1408 follows undulating path 1418. Not all the paths have to undulate. Some paths may be straight lines. Paths 1412, 1414, 1416 and 1418 may have a periodicity, i.e., repeat themselves after a given time interval T (e.g., a period T). In one application, all the paths have the same period T. However, in another exemplary embodiment, each path has its own period $T_i$. In an exemplary embodiment, each path is a sinusoid.

Further, each path may have its own amplitude A. However, in one embodiment, all the amplitudes are equal. Still in another exemplary embodiment, the amplitudes are divided into subsets, and each subset has a same value. A subset may include any number of paths, from one to the maximum number of paths. The amplitude $A_i$ may be defined as the maximum deviation of the vessel from a straight line path. For example, for vessel 1402, the maximum deviation from the straight line path 1422 is shown as $A_1$. The amplitudes $A_2$ to $A_4$ of the remaining vessels are also illustrated in FIG. 14. In another application, the distance between the maximum deviation of the vessel on one side of the straight line path and the maximum deviation on the other side is divided by two to generate the amplitude.

A third parameter that may be used to characterize the undulating paths 1412, 1414, 1416 and 1418 is the phase. The phase may be measured from a given cross-line reference 1440 (extending along a Y axis) that is substantially perpendicular on the straight line paths 1422, 1424, 1426 and 1428. The phase represents the distance of a vessel to the reference 1440. The phase may be represented as an angle if the undulating path is a sinusoid. A position of the vessel or the source measured along the straight line paths determine the phase $\varphi_i$ for each vessel. As with the amplitudes and periods, the phases may be different from vessel to vessel. In one embodiment, the phases must be different from vessel to vessel to achieve a better azimuth and/or offset distribution. In another application, the sources are shot in a staggered way, i.e., if the sources are shot simultaneously, a distance stag 1445 (inline distance along inline axis X), between the first source 1404B and the last source 1402B along the straight line paths is maintained during the seismic survey.

A further parameter of the seismic survey system 1400 is the cross-line offset 1450, i.e., the distance between the first straight line path 1422 and the last straight line path 1424. For a given cross-line offset 1450, the cross-line distance between adjacent straight line paths may vary from vessel to vessel. In one application, there is a minimum cross-line distance D1 between two adjacent straight line paths and a maximum cross-line distance D2 between another two adjacent straight line paths. Thus, all cross-line distances fall between D1 and D2. However, the cross-line distances may be the same in one application. FIG. 14 also shows that each vessel has a source 1402B, 1404B, 1406A and 1408A, respectively, and streamer vessels 1402 and 1404 tow corresponding streamer spreads 1402A or 1404A.

Figure 15:
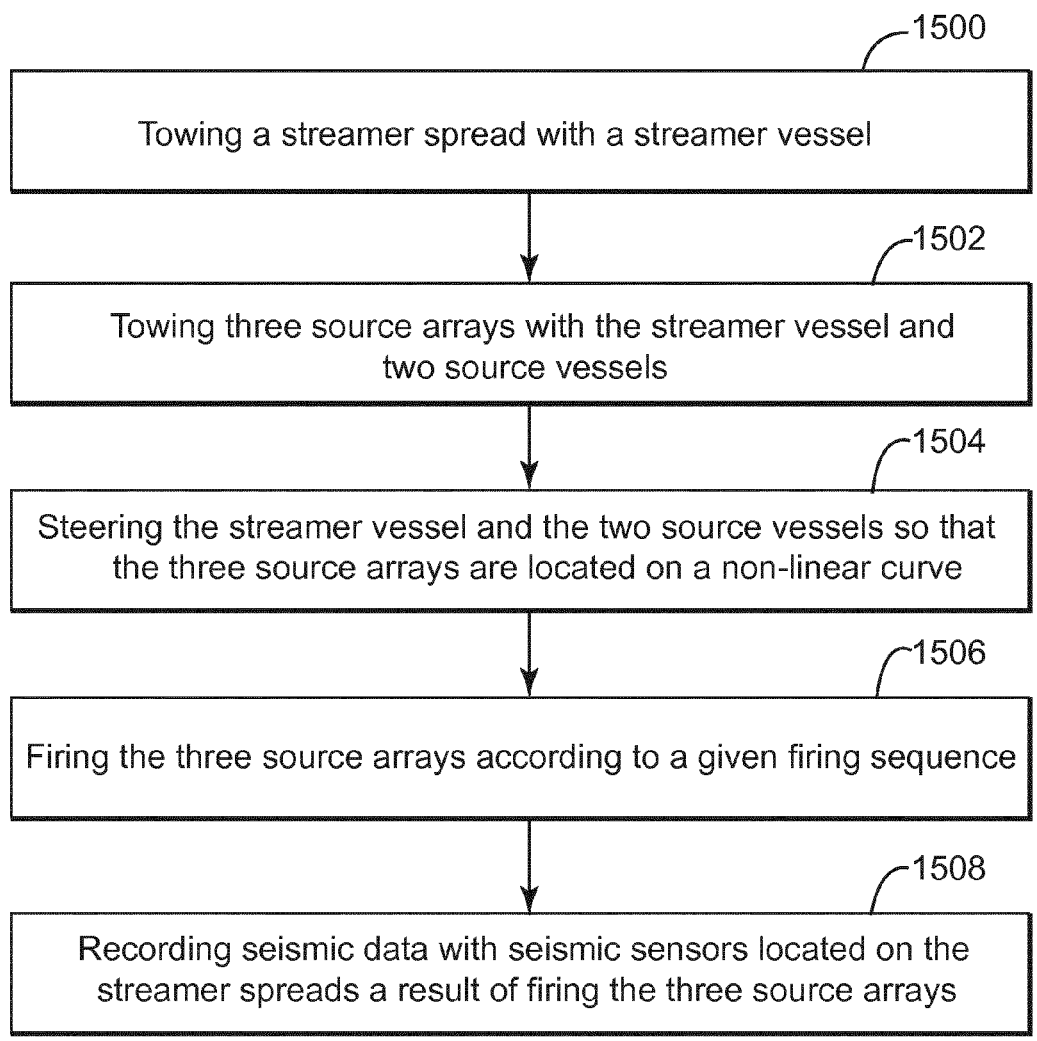
FIG. 15 is a flowchart of a method for towing seismic sources distributed along a non-linear profile.

A method for acquiring seismic data based on one of the embodiments discussed above is now discussed with regard to FIG. 15. The method includes a step 1500 of towing at least one streamer spread with a streamer vessel, a step 1502 of towing three source arrays with the streamer vessel and two source vessels, a step 1504 of steering the streamer vessel and the two source vessels so that the three source arrays are located on a non-linear profile, a step 1506 of firing the three source arrays according to a given firing sequence, and a step 1508 of recording seismic data with seismic sensors located on the streamer spreads as a result of firing the three source arrays. More source arrays and/or streamer spreads may be used. In one embodiment, two streamer vessels and one source vessels are towing the three source arrays.

Figure 16:
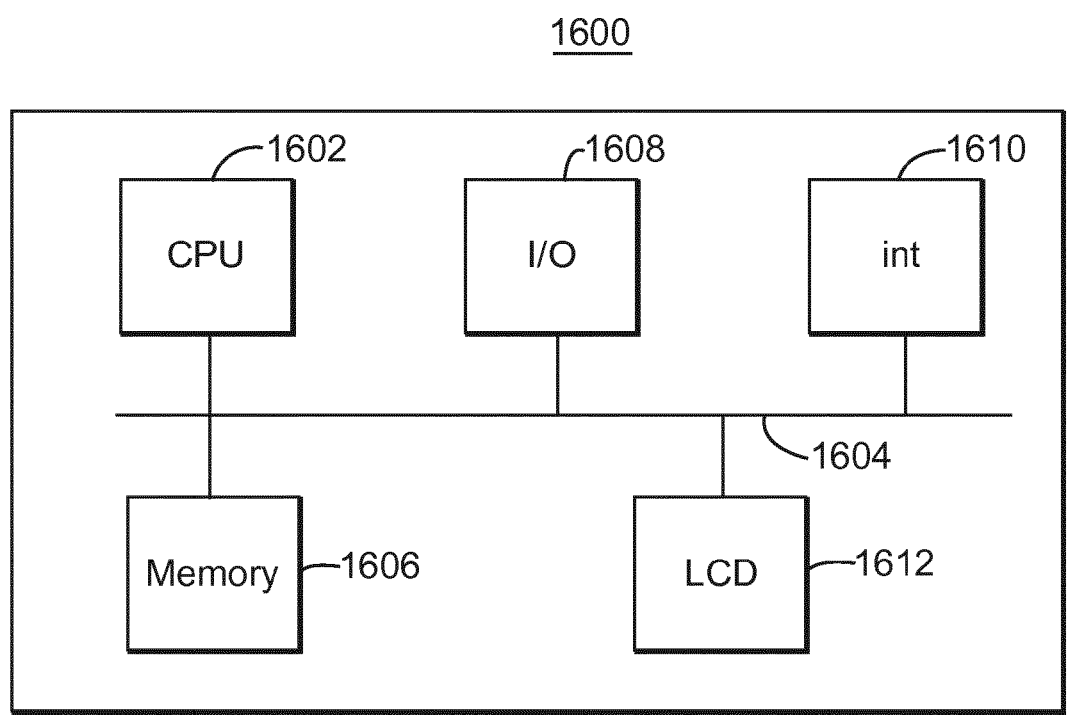
FIG. 16 is a schematic illustration of a computing device to implement various methods described herein according to an exemplary embodiment.

The methods and algorithms discussed above may be implemented in a computing device 1600 as illustrated in FIG. 16. The computing device 1600 may be a processor, a computer, a server, etc. The computing device 1600 may include a processor 1602 connected through a bus 1604 to a storage device 1606. The storage device 1606 may be any type of memory and may store necessary commands and instructions associated with firing the sources as discussed above. Also connected to the bus 1604 is an input/output interface 1608 through which the operator may interact with the sources, for example, for locating the sources on a desired non-linear profile as illustrated in FIGS. 4 and 11A. A communication interface 1610 is also connected to the bus 1604 and is configured to transfer information between the processor 1602 and an outside network, Internet, operator's internal network, etc. The communication interface 1610 may be wired or wireless. Optionally, computing device 1600 may include a screen 1612 for displaying various results generated by the algorithms discussed above. For example, the positions of the sources may be displayed, after being calculated with the novel algorithms, on the screen 1612.

The above-disclosed exemplary embodiments provide a system and a method for improving an azimuth and/or offset distribution for a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A marine seismic acquisition system comprising:
   a first streamer vessel configured to tow a first source array and a first streamer spread;
   a first source vessel configured to tow a second source array; and
   a second source vessel configured to tow a third source array,
   wherein the first to third source arrays are distributed along a non-linear profile while the first streamer vessel and the first to second source vessels move along an inline direction (X), the second and the third source array being towed on a same side of the first streamer spread relative to the inline direction, and
   wherein the first streamer vessel, the first source vessel and the second source vessel are (1) staggered along the inline direction so that no two vessels have a same inline position and (2) staggered along a cross-line direction so that no two vessels have a same cross-line position, the cross-line direction being perpendicular to the inline direction.

2. The system of claim 1, wherein the non-linear profile is a parameterized line described by at least one mathematical function.

3. The system of claim 1, wherein the non-linear profile is one of a portion of a circle, ellipse, or parabola.

4. The system of claim 1, wherein the non-linear profile is described by two linear functions different from each other.

5. The system of claim 1, further comprising:
   a second streamer vessel configured to tow a fourth source array and a second streamer spread; and
   a third source vessel configured to tow a fifth source array,
   wherein each vessel of the first and second streamer vessels and first to third source vessels has a unique inline position when compared to a remainder of the vessels, and
   wherein the first to fifth source arrays are distributed along the non-linear profile.

6. The system of claim 5, wherein each vessel also has a unique cross-line position when compared to the remainder of the vessels.

7. The system of claim 5, wherein the first and second streamer vessels sandwich the first to third source vessels along the cross-line direction.

8. The system of claim 1, wherein at least one of the first to second source vessels follows an undulating path.

9. The system of claim 8, wherein the undulating path is a curved path having a wavelength.

10. The system of claim 8, wherein each of the first to second source vessels follows a corresponding undulating path.

11. The system of claim 1, wherein each source array is fired according to a regular shot grid.

12. The system of claim 1, wherein a cross-line offset between any two adjacent source arrays is the same for all source arrays.

13. The system of claim 1, wherein an inline distance from the first streamer vessel to the first source vessel is smaller than an inline distance from the first streamer vessel to the second source vessel and a cross-line distance from the first streamer vessel to the first source vessel is smaller than a cross-line distance from the first streamer vessel to the second source vessel.

14. A marine seismic acquisition system comprising:
   first to $n^{th}$ vessels, each configured to tow a corresponding source array of first to $n^{th}$ source arrays; and
   at least one vessel also configured to tow a corresponding streamer spread,
   wherein the first to $n^{th}$ source arrays are distributed along a non-linear profile while the first to $n^{th}$ vessels move along an inline direction (X), the second to $n^{th}$ source arrays being towed on a same side of the streamer spread relative to the inline direction, and wherein the first to n$^{th}$ vessels are (1) staggered along the inline direction so that no two vessels have a same inline position and (2) staggered along a cross-line direction so that no two vessels have a same cross-line position, the cross-line direction being perpendicular to the inline direction.

15. The system of claim 14, wherein the non-linear profile is a parameterized line described by at least one mathematical function.

16. The system of claim 14, wherein the non-linear profile is one of a portion of a circle, ellipse, or parabola.

17. The system of claim 14, wherein the non-linear profile is described by two linear functions different from each other.

18. The system of claim 14, wherein each vessel of the first to n$^{th}$ vessels has a unique inline position when compared to a remainder of the vessels.

19. A method for acquiring marine seismic data, the method comprising:
towing one streamer spread with a streamer vessel along an inline direction;
towing three source arrays with the streamer vessel and first and second source vessels, wherein the second and the third source array are towed on a same side of the streamer spread relative to the inline direction;
steering the streamer vessel and the first and second source vessels so that the three source arrays are located on a non-linear curve;
firing the three source arrays according to a given firing sequence; and
recording seismic data with seismic sensors located on the streamer spread as a result of firing the three source arrays,
wherein the streamer vessel, the first source vessel and the second source vessel are (1) staggered along the inline direction so that not two vessels have a same inline position and (2) staggered along a cross-line direction so that not two vessels have a same cross-line position, the cross-line direction being perpendicular to the inline direction.

20. The method of claim 19, wherein the non-linear profile is a parameterized line described by at least one mathematical function.

* * * * *